United States Patent [19]

Brooks et al.

[11] 4,338,344
[45] Jul. 6, 1982

[54] PROCESS FOR PRODUCING A QUICK-COOKING RICE

[75] Inventors: Arthur W. Brooks, Dover, Del.; Richard B. Stevenson, Englishtown, N.J.; Leonard Bell, Allston, Mass.

[73] Assignee: General Foods Corporation, White Plains, N.Y.

[21] Appl. No.: 113,158

[22] Filed: Jan. 18, 1980

[51] Int. Cl.³ .......................... A23B 9/00; A23L 1/10
[52] U.S. Cl. ..................................... 426/461; 426/462; 426/508; 426/618; 99/355; 99/404
[58] Field of Search ............... 426/507, 508, 618, 627, 426/640, 519, 452, 461, 462, 467; 99/443 C

[56] References Cited

U.S. PATENT DOCUMENTS

| | | | |
|---|---|---|---|
| 2,438,939 | 4/1948 | Ozai-Durrani | 426/627 |
| 2,498,573 | 2/1950 | Ozai-Durrani | 426/461 |
| 2,525,137 | 10/1950 | Jones et al. | 426/461 |
| 2,592,407 | 4/1952 | Fernandes | 426/311 |
| 2,758,031 | 8/1956 | Ozai-Durrani | 426/461 |
| 2,801,176 | 7/1957 | Ozai-Durrani | 426/620 |
| 2,828,209 | 3/1958 | Hollis et al. | 426/462 |
| 3,083,102 | 3/1963 | Carcassonne-Leduc | 426/461 |
| 3,085,011 | 4/1963 | Wayne | 426/507 |
| 3,157,514 | 11/1964 | Gorozpe | 426/508 |
| 3,189,461 | 6/1965 | Ozai-Durrani et al. | 426/461 |
| 3,261,690 | 7/1966 | Wayne | 426/417 |
| 3,336,137 | 8/1967 | Hickey | 426/508 |
| 3,778,521 | 12/1973 | Fisher et al. | 426/508 |

FOREIGN PATENT DOCUMENTS 563792 8/1944 United Kingdom ............... 426/508

Primary Examiner—Raymond N. Jones
Assistant Examiner—Elizabeth J. Curtin
Attorney, Agent, or Firm—Daniel J. Donovan; Thomas R. Savoie

[57] ABSTRACT

The object of the invention is to provide an improved process for preparing a fully gelatinized rice.

FIG. 1 shows an inclined enclosed chamber 10 wherein rice is cooked in hot water in a first zone at low end 12 and is steamed in a second zone at raised end 14. Locks 32 and 34 permit continuous pressure operation. The rice removed from lock 34 has a moisture content of 30 to 75% and its starch is substantially completely gelatinized. The cooked rice is preferably drived in conventional manner such as in drier 40.

The invention enables the preparation of a high quality fully gelatinized rice with less energy consumption, less loss of product weight and decreased effluents in need of treatment than conventional processes.

24 Claims, 2 Drawing Figures

PROCESS FOR PRODUCING A QUICK-COOKING RICE

TECHNICAL FIELD

This invention relates to the production of a fully gelatinized rice, and more particularly to an improved process and an improved apparatus for producing fully gelatinized rice which preferably is dry and quick-rehydrating.

Known processes and apparatus for cooking rice in the preparation of a fully gelatinized rice provide good quality products, but are less efficient in a number of regards and more costly than desired. It would be desirable to have, and this invention provides, processes and apparatus which produce a high quality product with less energy consumption, less water consumption, less product weight loss and less effluents in need of treatment, and which can accomplish this in reduced processing time than conventional processes which water cook or water cook and steam the rice.

BACKGROUND ART

The basic process for preparing quick-rehydrating rice products is described in U.S. Pat. No. 2,438,939 to Ozai-Durrani. According to that disclosure, rice is first cooked in water to substantially gelatinize the starch and raise the moisture content of the rice grains to cause substantial swelling of the grains. The swollen grains are then dried by circulating air at a temperature of up to about 140° C., through the grains. The hot air dries the grains in their enlarged condition by causing the exterior to dry first and harden. The enlarged or swollen rice grains are easier to hydrate. Products made by this process have enjoyed substantial commercial success, but are costly to produce.

In United Kingdom Patent Specification No. 563,792, there is described a process for cooking cereals, such as rice, for the preparation of a quick-rehydrating product. According to this disclosure, the cereal is steeped and steamed in a single vessel; however, this is a batch process. There is no recognition therein that decreased energy usage, decreased product solids losses, and time savings could be achieved in preparing a fully gelatinized rice of high quality, by continuously moving the rice through cooking and steaming zones simultaneously maintained within the same enclosed vessel.

There have been efforts to run various processes and unit operations continuously in a variety of rice processes. For example, U.S. Pat. No. 3,261,690 to Wayne, employs screw conveyors to mill rice as well as convey it to various processing units. Also, U.S. Pat. Nos. 2,498,573, 2,525,137, 2,592,407, 2,758,031, 2,801,176, and 3,085,011 disclose employing separate screw conveyors for each of the processing steps of soaking, steaming and drying the rice. Simple conveying of rice by screw conveyor is also disclosed. However, none of these references recognized that substantial efficiencies and savings could be obtained in the preparation of a fully gelatinized rice by carrying out both the cooking and steaming steps in the same vessel with continuous movement of the rice from a water cooking zone to a steaming zone.

The use of pressure cookers employing continuous screw conveyors is known for steam peeling potatoes, steaming oysters, and the like processes; however, their use with water in a first zone to cook a potentially sticky product such as rice and then steam in a second zone within the same enclosed chamber is unknown.

SUMMARY OF THE INVENTION

In accordance with the present invention, there is now provided an improved process and apparatus for preparing a fully gelatinized rice product by cooking the rice in water in a first zone under conditions effective to raise the moisture content to within the range of from 30 to 75% by weight and to partially gelatinize the rice, then subjecting the rice to steam cooking in a second zone to substantially complete gelatinization of the starch in the rice, and then preferably drying the rice. The improvement in the process comprises maintaining said first and second zones within the same enclosed vessel and continuously advancing rice from said first zone to said second zone.

The improvement in the apparatus comprises the combination of: an inclined chamber enclosing the first and second zones comprising an inlet at the low end for continuously adding rice thereto and an outlet for continuously withdrawing cooked rice therefrom; a means for continuously advancing rice through the chamber; preferably a means for agitating rice as said rice is conveyed from said inlet to said outlet; a means for supplying water to said low end of said chamber to form said first zone; and a means for controlling the water level in said low end such that the water will cover from about 40 to 90% of the length of the path of travel of the rice through the chamber.

BRIEF DESCRIPTION OF THE DRAWINGS

The invention will be better understood and its advantages will become more apparent from the following detailed description, especially when read in light of the attached drawings wherein.

BEST MODE FOR CARRYING OUT THE INVENTION

The apparatus and method of the present invention enable the production of a high quality fully gelatinized rice product in less time and with less energy consumption, less water consumption and less loss of rice solids to the cooking water than has been possible with conventional processes which water cook or water cook and steam the rice.

Figure 1:
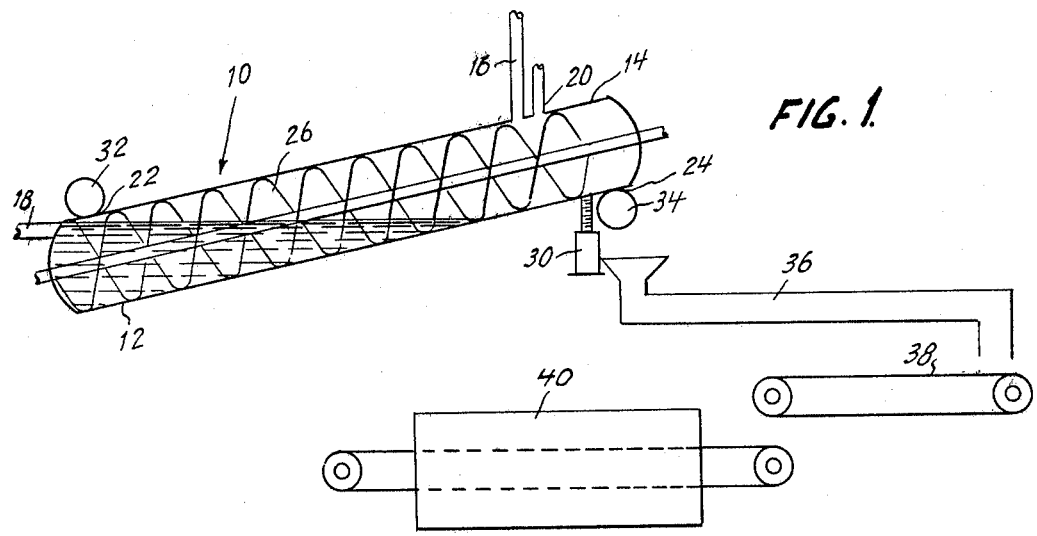
FIG. 1 is a schematic representation of a preferred embodiment of the process and the apparatus of the present invention.

Referring to FIG. 1, there is seen an inclined enclosed cylindrical chamber 10 as the cooking vessel which has a low end 12 and a raised end 14. Water is fed to the chamber 10 by line 16 and collects at the low end 12 to form a first zone within the chamber 10 wherein rice is cooked to an extent effective to raise its moisture content to within the range of from 30 to 75%, preferably 60 to 75%, by weight of the cooked rice and to partially gelatinize the rice. The water is removed from the chamber 10 at water outlet 18 which is positioned to maintain the water at the desired level. Steam is introduced at steam inlet 20 to maintain a steam atmosphere in the raised end 14 to form a second zone within the enclosed chamber 10 to further cook the rice and substantially complete gelatinization of the starch in the rice. By enclosed, what is meant is that the chamber 10 is not substantially open to the atmosphere to allow significant heat or moisture loss.

The enclosed chamber 10, or other suitable enclosed vessel maintaining first and second zones 12 and 14, is provided with means for feeding rice at the low end 12 and for withdrawing cooked rice at the raised end 14. FIG. 1 schematically shows rice inlet 22 and outlet 24. It is preferred to provide means to agitate the rice as it is continuously conveyed from the inlet 22 at the low end 12 of chamber 10 to the outlet 24 at the raised end 14 of the chamber 10. FIG. 1 shows screw conveyor 26 which agitates the rice as it is being conveyed. Agitation of the rice becomes important when more than a mono layer of rice is to be processed (i.e. multi-layers of rice) to ensure uniform hydration and gelatinization of the rice in the first and second zones.

Figure 2:
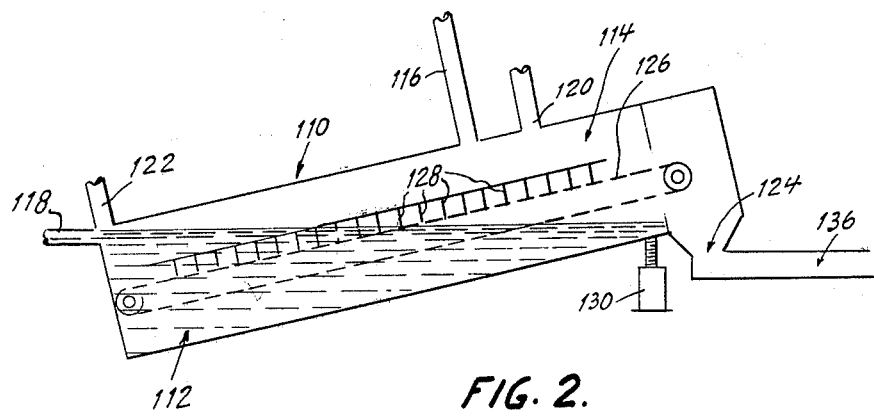
FIG. 2 is a schematic representation of an alternative embodiment of a single-chamber cooking and steaming vessel according to the present invention.

FIG. 2 shows an alternative embodiment of an enclosed vessel containing first and second zones for continuously cooking and steaming rice. According to this embodiment, an open mesh conveyor belt 126 conveys rice from the inlet 122 to the outlet 124 of vessel 110. Agitation of the rice as it is conveyed is provided by a plurality of downwardly depending pins 128. The remainder of the means which are equivalent to those in FIG. 1, starting with identification number 110, have the same last two digits of the corresponding identification number used in FIG. 1.

The rice can be raw, parboiled, brown or wild rice. It can be untreated, or pretreated, such as by presoaking or preheating. Preferably the rice will be raw white rice or parboiled rice. The water employed to cook the rice in the first zone is preferably acidified by a suitable acidulant, such as phosphoric acid, adipic acid, citric acid, or hydrochloric acid, to bring the pH within the range of from 3 to 7, preferably about 5.

Chamber 10, which encloses the first and second zones for cooking and steaming the rice, has means associated with it for controlling the level of water in the low end 12 such that the water will cover from about 40 to 90% of the length of the path of travel of the rice through the chamber. In the apparatus shown in FIG. 1, the water level is a function of a number of factors including the diameter-to-length ratio of the chamber 10, the quantity of water required, and the angle of incline of the chamber 10. Where any two of these factors are held constant, means for varying the third can control the level of water and the proportion which the water covers the path of travel of the rice through the chamber 10. The angle of incline can be adjusted by suitable means such as jack 30, which can be screw operated and is preferably fitted with a locking device. The quantity of water in the enclosed chamber 10 will preferably be controlled by suitable means such that the upper surface of the water closely approaches the upper surface of the chamber 10 at the low side 12 of the chamber. The means for controlling the level at this point can simply be water outlet 18, or means external to the outlet 18 can be employed. The diameter to length ratio of the chamber 10 of an enclosed screw conveyor will preferably be within the range of from 0.10 to 0.25, and most preferably from 0.13 to 0.17.

The water level is desirably controlled such that from about 40 to 90% of the path of the rice through the enclosed chamber 10 is covered with water. Preferably, the water will cover from about 50 to 80% of the path of the rice through the chamber 10. By varying the longitudinal extent of the water and the relative sizes of the first and second zones, the time the rice is within each zone can therefore be controlled to provide the optimum hydration and gelatinization. Additionally, a variable pitch screw can be employed in the screw conveyor, wherein the distance between the flights of the screw are varied to control the rate of advance of the rice and therefore the amount of time the rice is within each zone.

The chamber 10 can be operated at atmospheric pressure, but is preferably adapted to operate at superatmospheric pressure and is fitted with pressure locks 32 and 34 (e.g. rotary pressure locks) at the rice inlet 22 and at the rice outlet 24, respectively. The use of superatmospheric pressure enables more rapid hydration and gelatinization due to the higher temperatures which are achieved. Preferably, pressures of up to about 10 psi (520 mm of mercury) above atmospheric pressure are employed, with higher pressure being generally undesireable as excessive dextrinization occurs. The construction of the pressure locks is conventional, as is their use to permit continuous addition and withdrawal of rice while operating under pressure. In general, the temperature of the water in the first zone will be maintained within the range of from about 80° C. (175° F.) to 110° C. (230° F.) Care should be exercised with temperatures higher than about 110° C. as dextrinization of the starch can occur.

For atmospheric operation, the temperature will vary up to about 100° C. (212° F.) and will preferably be within the range of from about 95° C. (200° F.) to 100° C. (212° F.). To raise the moisture content of the rice to the requisite 30 to 75%, preferably 60 to 75%, cooking times in the first zone will typically be within the range of from about 10 to 50 minutes, and preferably from about 10 to 30 minutes. The length of cooking time can be varied by varying the length of chamber 10, the longitudinal extent therein of the water comprising the first zone 12, or the rate of advance of the rice through the water. Steam will be supplied at the rate necessary to maintain a steam atmosphere in the second zone to substantially complete gelatinization of the rice as it passes therethrough. This will take about 1 to 30 minutes, with steaming times of from about 10 to 25 minutes being preferred.

For superatmospheric operation, the temperature of the water in said first zone will typically be in the range of from about 100° C. (212° F.) to 110° C. (230° F.), and preferably will be within the range of from about 103° C. (217° F.) to 110° C. (230° F.). Steam pressures in the range of from about 150 to 260 mm of mercury (3 to 5 psi) above atmospheric pressure will generally be preferred. The cooking times of the rice in the first zone for superatmospheric processing will typically be within the range of from about 2 to 30 minutes, and will preferably be from about 8 to 18 minutes. Retention times of the rice in the steam in the second zone will be from about 1 to 30 minutes, with about 5 to 15 minutes being preferred.

The fully cooked rice upon exiting the chamber is preferably washed to remove excess surface starch and to cool the rice. This can be accomplished with a spray of water or, as shown in the Figures, in a flume 36 of moderately heated water to cool the rice to a temperature below about 77° C. (170° F.), the gelatinization temperature of the rice starch. The rice is then drained such as by belt drainer 38 which conveys the rice to drier 40. The details of drying are conventional in the art. Typically, drying can be accomplished in a belt drier 40 wherein air at a temperature within the range of from about 150° C. (300° F.) to 180° C. (360° F.) is circulated through the rice for a period of from about 5 to 15 minutes. These or other suitable drying conditions can be employed to reduce the moisture content of the rice to a level effective to permit stable storage. Typically, the moisture content will be about 12% or less, and will preferably be reduced to about 9%, based on the total weight of the rice product. Alternatively, instead of drying, the rice can be frozen to permit stable storage.

The preferred dry quick-rehydrating fully gelatinized rice product prepared in this manner is easily rehydrated for serving by preferably adding the rice product to boiling water and then removing from the heat and allowing the rice to stand for about 3 to 10 minutes. Other means of rehydrating the dry rice product can be employed depending upon the particular dry rice product produced, but preferably the rice is quick rehydrating, i.e. rehydrates in 5 to 10 minutes by either simmering, standing, and/or boiling. The water can be salted and seasoned or flavored as desired. The frozen fully gelatinized rice product can be prepared simply by reheating.

The following examples are presented for the purpose of further illustrating and explaining the invention and are not to be taken as limiting in any regard. Unless otherwise indicated, all parts and percentages are by weight.

EXAMPLE I

This example describes the preparation of a dry quick-rehydrating fully gelatinized rice according to the invention, wherein cooking is conducted in an apparatus as in FIG. 1 at atmospheric pressure.

Raw, milled white rice was introduced at a rate of 82 kilograms (180 lbs) per hour through a rotary inlet lock at the low end of an enclosed continuous screw cooker which was inclined at an angle of 11.3°. The cooker had a cylindrical chamber 0.36 meters (14 inches) in diameter and 2.74 meters (9 feet) long. A screw conveyor was rotated within the chamber at a rate effective to continuously advance the rice from the inlet to a like rotary lock at the outlet at a linear rate of 6.85 meters per hour. Water at a temperature of 110° C. (230° F.) and a pH of 5.0 (adjusted with phosphoric acid) was added from the top of the chamber, about three forths of the distance from the inlet to the outlet, at a rate of about 450 liters per hour. The water filled the low end of the chamber to a depth of 0.36 meters at its deepest point and covered 66% of the bottom surface of the chamber from the low end thereof to the outlet rotary lock. The water was constantly removed at the low-end of the chamber to maintain this quantity of water.

In the first zone, the water at the low end of the chamber was maintained at a temperature of about 95° C. (203° F.), and saturated steam was supplied to the raised end of the chamber at a rate of 40 kg per hour. The rice was cooked in the water which forms the first zone in the chamber for about 16 minutes, during which time its moisture content was raised to about 70%. The screw conveyor continuously moved the rice out of the first zone into the steam in the raised end of the chamber which formed the second zone. The rice was steamed in the second zone until the starch within the rice grains, which was partially gelatinized in the first zone, became substantially completely gelatinized. This stage of the process took about 8 minutes.

The cooked rice was continuously removed from the chamber through a rotary lock and immersed in a flume wherein the water was maintained at a temperature of about 38° C. (100° F.). The flume carried the rice to a draining belt which then conveyed the rice to a multiple zone conventional continuous belt drier operated at an air temperatures of 135° C. to 180° C. wherein the rice was dried to a moisture content of about 9% in about 10 minutes.

The rice product produced in this manner was judged to be of excellent quality. The average starch loss was within the range of from about 6% to 8%, depending principally on the nature of the starting material. For example, rice from crops near the end of the growing season tended to lose less solids than rice from crops harvested near the beginning of the season. Energy consumption for the entire process was within the range of from 750 to 1200 kilocalories per kilogram of rice product. Water required for the process was found to range from 11 to 13.5 kilograms per kilogram of rice product.

EXAMPLE II

This example describes the preparation of a dry quick-rehydrating fully gelatinized rice product according to the invention wherein the rice was cooked and steamed under a steam pressure of about 200 millimeters of mercury (4 psi) above atmospheric pressure. The basic process remains the same as described in Example I, except that the screw cooker was pressurized with steam and the water temperature in the first cooking zone was maintained at about 110° C. (230° F.). Because of the higher operating temperatures, retention time in the first zone (water) was about 13 minutes and in the second zone (steam) was about 7 minutes.

The quality of the rice was judged to be the same as in Example I, as was the usage of water. However, the rice solids losses were reduced to the range of from about 5 to 7%, and the energy required was reduced to the range of from 500 to 930 kilocalories per kilogram of rice product.

EXAMPLE III

This example describes the preparation of dry quick-rehydrating rice by a conventional process, which water cooks then steams the rice to produce a high quality quick-rehydrating, fully gelatinized rice product.

Raw milled white rice was totally immersed into 98° C. water in a reel type blancher for 12 minutes to partially gelatinize the rice and increase its moisture content to about 63%. The rice was then deposited into a hot water (93° C.) flume and pumped to a continuous screw pressure cooker. As the rice entered the screw cooker its moisture content was raised to about 67%. The rice was steamed under a steam pressure of 3 psi (150 mm of mercury) above atmospheric pressure for 10 minutes to fully gelatinize the starch of the rice. The final moisture content of the rice was 72%. From this point, the rice was processed as in Example I, i.e. the rice was continuously removed from the screw cooker and immersed into a cold water (38° C.) flume, by which it was conveyed to a draining belt and then to a conventional dryer.

The quality of the product was judged to be the same as in Example I. However, the water required from the process increased to about 18.5 kilograms per kilogram of rice product, the energy consumption increased to about 4200 kilocalories per kilogram of rice product, and the rice solids losses increased to about 10%.

The above description is for the purpose of teaching the person skilled in the art how to practice the present invention. This description is not intended to detail all of the obvious modifications and variations of the invention which will become apparent upon reading. However, applicants do intend to include all such obvious modifications and variations within the scope of their invention which is defined by the following claims.

What is claimed is:

1. An improved method for preparing a quick-rehydrating, fully gelatinized rice from raw, parboiled, brown, wild, or milled white rice where the rice is introduced into a 175° F. to 230° F., pH between 3 and 7, water bath inside an inclined, enclosed chamber that is between 40 and 90% filled with water and the rice conveyed through the water bath from the bottom to the surface within a time range of 10 to 50 minutes, with the rice being continuously agitated while it is being conveyed through the chamber, and upon the rice being conveyed through the surface of the water, the rice enters a steam atmosphere, said steam atmosphere conditions being controlled by the temperature of the water bath, and the rice is conveyed through the steam atmosphere with agitation in from 1 to 30 minutes after which the rice is removed from the cooking chamber at a moisture between 30 and 75% and thereafter dried to a moisture of less than 12%.

2. A process according to claim 1 wherein the moisture content of the rice after cooking in the first zone is within the range of 60 to 75%.

3. A process according to claim 1 wherein the first and second zones are maintained at a superatmospheric pressure.

4. A process according to claim 1 wherein a multi-layer of the rice is processed and the rice is agitated in said first and second zones.

5. A process according to claim 1 wherein the rice is continuously conveyed into, through and out of said first and second zones.

6. A process according to claim 1 wherein the temperature of the water in said first zone is within the range of about 80° C. to 110° C.

7. A process according to claim 3 wherein the temperature of the water in said first zone is within the range of about 100° C. to 110° C.

8. A process according to claim 1 wherein said rice is cooked in said first zone for about 2 to 30 minutes and steamed in said second zone for about 1 to 30 minutes.

9. A process according to claim 1 wherein the temperature of the water in said first zone is within the range of about 103° C. to 110° C. and the steam in said second zone is at a pressure within the range of about 3 to 5 psi above atmospheric pressure.

10. A process according to claim 9 wherein said rice is cooked in said first zone for about 8 to 18 minutes and steamed in said second zone for about 5 to 15 minutes.

11. A process according to claim 1 wherein the temperature of the water in said first zone is within the range of about 80° C. to 100° C.

12. A process according to claim 12 wherein said rice is cooked in said first zone for about 10 to 50 minutes and steamed in said second zone for about 1 to 30 minutes.

13. A process according to claim 12 wherein the temperature of the water in said first zone is within the range of about 95° C. to 100° C.

14. A process according to claim 13 wherein said rice is cooked in said first zone for about 10 to 30 minutes and steamed in said second zone for about 10 to 25 minutes.

15. A process according to claim 1 wherein said rice is agitated while it is continuously advanced from an inlet at said low end of said chamber to an outlet at said raised end of said chamber.

16. A process according to claim 15 wherein downwardly projecting pins contact and agitate said rice while it is advanced.

17. A process according to claim 15 wherein said rice is agitated and advanced by an enclosed screw conveyor.

18. A process according to claim 17 wherein said chamber is cylindrical and has a diameter to length ratio within the range of 0.10 to 0.25.

19. A process according to claim 18 wherein the diameter-to-length ratio is within the range of 0.13 to 0.17.

20. A process according to claim 1 wherein the chamber is inclined to a degree effective to cause the water to cover from about 40 to 90% of the path of the rice through said chamber.

21. A process according to claim 22 wherein said chamber is inclined to a degree effective to cause the water to cover from about 50 to 80% of the path of rice through said chamber.

22. A process according to claim 17 wherein the screw conveyor contains a variable pitch screw to control the rate of advance of the rice through each zone.

23. A process according to claim 1 further comprising drying the fully gelatinized rice.

24. A process according to claim 1 further comprising freezing the fully gelatinized rice.

* * * * *